United States Patent
Borthakur et al.

(10) Patent No.: US 7,636,710 B2
(45) Date of Patent: Dec. 22, 2009

(54) SYSTEM AND METHOD FOR EFFICIENT FILE CONTENT SEARCHING WITHIN A FILE SYSTEM

(75) Inventors: Dhrubajyoti Borthakur, San Jose, CA (US); Nur Premo, San Jose, CA (US); Craig K. Harmer, San Francisco, CA (US)

(73) Assignee: Symantec Operating Corporation, Mountain View, CA (US)

( * ) Notice: Subject to any disclaimer, the term of this patent is extended or adjusted under 35 U.S.C. 154(b) by 972 days.

(21) Appl. No.: 10/793,070

(22) Filed: Mar. 4, 2004

(65) Prior Publication Data

US 2005/0198010 A1    Sep. 8, 2005

(51) Int. Cl.
    *G06F 17/30* (2006.01)
(52) U.S. Cl. .................... 707/3; 707/102; 707/200; 707/205
(58) Field of Classification Search .............. 707/102, 707/3, 200, 205
    See application file for complete search history.

(56) References Cited

U.S. PATENT DOCUMENTS

| 5,313,646 | A | * | 5/1994 | Hendricks et al. ........... 707/101 |
| 5,388,257 | A | * | 2/1995 | Bauer ........................... 707/1 |
| 5,706,496 | A | | 1/1998 | Noguchi et al. |
| 5,848,410 | A | * | 12/1998 | Walls et al. ................... 707/4 |
| 5,907,837 | A | * | 5/1999 | Ferrel et al. ................... 707/3 |
| 6,026,474 | A | | 2/2000 | Carter et al. |
| 6,067,541 | A | * | 5/2000 | Raju et al. ..................... 707/3 |
| 6,240,401 | B1 | | 5/2001 | Oren et al. |
| 6,240,429 | B1 | | 5/2001 | Thornton et al. |
| 6,286,013 | B1 | | 9/2001 | Reynolds et al. |
| 6,353,823 | B1 | | 3/2002 | Kumar |
| 6,374,266 | B1 | * | 4/2002 | Shnelvar ....................... 707/204 |
| 6,389,538 | B1 | | 5/2002 | Gruse et al. |
| 6,401,118 | B1 | * | 6/2002 | Thomas ........................ 709/224 |
| 6,519,648 | B1 | * | 2/2003 | Eyal ...................... 707/E17.009 |
| 6,640,225 | B1 | | 10/2003 | Takishita et al. |

(Continued)

FOREIGN PATENT DOCUMENTS

EP     1376405     1/2004

(Continued)

OTHER PUBLICATIONS

DtSearch Corp., "dtSearch 6 User's Manual", Dec. 31, 1991-Dec. 31, 2001, Version 6, p. i-iv, 1-58.*

(Continued)

*Primary Examiner*—Khanh B Pham
(74) *Attorney, Agent, or Firm*—Meyertons, Hood, Kivlin, Kowert & Goetzel, P.C.; B. Noel Kivlin; Anthony M. Petro

(57) ABSTRACT

A system and method for efficient file content searching within a file system. In one embodiment, the system may include a storage device configured to store data and a file system configured to manage access to the storage device. The file system may be configured to detect a search operation to determine the presence of a given data pattern within a first file stored on the storage device, and to store an indication of the given data pattern and an indication of result data of the search operation in a first record associated with the first file.

22 Claims, 5 Drawing Sheets

U.S. PATENT DOCUMENTS

| | | | |
|---|---|---|---|
| 6,725,275 B2 * | 4/2004 | Eyal | 709/231 |
| 6,772,141 B1 | 8/2004 | Pratt et al. | |
| 6,823,460 B1 * | 11/2004 | Hollander et al. | 726/3 |
| 6,853,992 B2 | 2/2005 | Igata | |
| 6,959,320 B2 * | 10/2005 | Shah et al. | 709/203 |
| 6,970,866 B1 | 11/2005 | Pravetz et al. | |
| 6,985,948 B2 | 1/2006 | Taguchi et al. | |
| 7,110,998 B1 | 9/2006 | Bhandari et al. | |
| 2001/0014894 A1 * | 8/2001 | Han et al. | 707/202 |
| 2001/0025311 A1 | 9/2001 | Arai et al. | |
| 2001/0037465 A1 * | 11/2001 | Hart et al. | 713/201 |
| 2002/0049699 A1 * | 4/2002 | Yano et al. | 707/1 |
| 2002/0049731 A1 | 4/2002 | Kotani | |
| 2002/0091763 A1 * | 7/2002 | Shah et al. | 709/203 |
| 2002/0095621 A1 * | 7/2002 | Lawton | 714/36 |
| 2002/0116402 A1 * | 8/2002 | Luke | 707/200 |
| 2003/0093556 A1 | 5/2003 | Yeung et al. | |
| 2003/0151633 A1 | 8/2003 | George et al. | |
| 2003/0154271 A1 | 8/2003 | Baldwin et al. | |
| 2003/0172368 A1 | 9/2003 | Alumbaugh et al. | |
| 2003/0182310 A1 * | 9/2003 | Charnock et al. | 707/104.1 |
| 2003/0191774 A1 * | 10/2003 | Slutz | 707/102 |
| 2004/0002942 A1 | 1/2004 | Pudipeddi et al. | |
| 2004/0059866 A1 | 3/2004 | Patel et al. | |
| 2004/0078750 A1 * | 4/2004 | Frank | 715/500 |
| 2004/0225730 A1 | 11/2004 | Brown et al. | |
| 2004/0249790 A1 * | 12/2004 | Komamura | 707/3 |
| 2005/0015461 A1 | 1/2005 | Richard et al. | |
| 2005/0038813 A1 | 2/2005 | Apparao et al. | |
| 2005/0050054 A1 * | 3/2005 | Clark et al. | 707/100 |
| 2005/0071856 A1 * | 3/2005 | Kumar et al. | 719/330 |
| 2005/0097089 A1 * | 5/2005 | Nielsen et al. | 707/3 |
| 2005/0114363 A1 | 5/2005 | Borthakur et al. | |
| 2005/0114381 A1 | 5/2005 | Borthakur et al. | |
| 2005/0114406 A1 | 5/2005 | Borthakur et al. | |
| 2005/0131871 A1 * | 6/2005 | Howard et al. | 707/3 |
| 2005/0177562 A1 * | 8/2005 | Raciborski | 707/3 |
| 2006/0004759 A1 | 1/2006 | Borthakur et al. | |
| 2006/0004787 A1 | 1/2006 | Borthakur et al. | |
| 2006/0184529 A1 * | 8/2006 | Berg et al. | 707/8 |

FOREIGN PATENT DOCUMENTS

| | | |
|---|---|---|
| WO | WO03/079663 | 9/2003 |

OTHER PUBLICATIONS

Symantec.com, News Release: Symantec Offers Norton File Manager Preview Version for Windows, Feb. 1996, Retrieved Oct. 4, 2006.*

Matt's Script Archive, "search.pl", 1996, p. 1-4. Retrieved Oct. 4, 2006.*

Archives.neohapsis.com, "HP-UX series 800 11.x patch digest", Published Nov. 16, 2003, Retrieved Oct. 5, 2006, p. 1, 29, 403. Tertiary source: <http://archives.neohapsis.com/archives/hp/2003-q4/0043.html>.*

Calishain et al., "Google Hacks", Feb. 28, 2003, OReilly Books, First Ed., p. 64-71.*

Ghemawat et al, "The Google File System",. Oct. 2003, SOSP'03, ACM Press, p. 1-15, <Retrieved from Google Papers on Jan. 19, 2009>.*

Dtsearch, "Distributed (Indexed) Searching: Evoluation to XML", Jul. 2001, PC AI Magazine, <Retrieved from www.pcai.com/pceai on Jan. 19, 2009>.*

Alexandrov, et al., "Ufo: A Personal Global File System Based on User-Level Extensions to the Operating System," University of California at Santa Barbara, XP-000849873, pp. 207-233.

PCT Application No. PCT/US2005/006868, International Search Report mailed Aug. 23, 2005.

"The Business Rationale for Distributed (Remote) Document Capture," Verity White Paper, Oct. 2003, downloaded from http://www.cardiff.com/cms/groups/public/documents/collateral/mk0535.pdf, 12 pages.

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/april03/staples/04staples.html, 12 pages.

Wildermuth, "A Developer's Perspective on WinFS: Part 1," Mar. 2004, downloaded from http://web.archive.org/web/20050414063209/http://msdn.microsoft.com/data/winfs/default.aspx?pull=/library/en-us/dnwinfsta/html/winfsdevpersp.asp, 10 pages.

* cited by examiner

SYSTEM AND METHOD FOR EFFICIENT FILE CONTENT SEARCHING WITHIN A FILE SYSTEM

BACKGROUND OF THE INVENTION

1. Field of the Invention

This invention relates to computer systems and, more particularly, to storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

In many conventional file-based computer systems, data of interest may be distributed across numerous files located in disparate logical and physical areas of the storage system. Different computing platforms often provide various types of search applications through which a user may determine which files include a particular data pattern, such as a text string. For example, a code developer may use such a search application to identify which files within a large and complex code base include a particular revision string, so that those files may be selected for an operation.

However, typical search applications require reading the entire contents of a file to determine whether a given data pattern occurs in that file, even though in most cases a given data pattern comprises a small portion of total file content if it exists in a given file at all. Further, many typical search applications lack history, such that if a search for a given data pattern within a given file is repeated, the entire contents of the file may be reexamined in the course of the search. Such redundant file access may substantially decrease the performance of a system that frequently performs file content searches.

SUMMARY OF THE INVENTION

Various embodiments of a system and method for efficient file content searching within a file system are disclosed. In one embodiment, the system may include a storage device configured to store data and a file system configured to manage access to the storage device. The file system may be configured to detect a search operation to determine the presence of a given data pattern within a first file stored on the storage device, and to store an indication of the given data pattern and an indication of result data of the search operation in a first record associated with the first file.

In one specific implementation of the system, subsequent to detecting the search operation, the file system may be further configured to scan the first record to determine whether the indication of the given data pattern is stored therein, and in response to determining that the indication is stored therein, to access only a portion of the first file.

In another specific implementation of the system, if the given data pattern is not present in the first file, the file system may be further configured to store the indication of the given data pattern in the first record. On the other hand, if the given data pattern is present in the first file, the file system may be further configured to store the indication of the given data pattern and pattern location information in a second record.

A method is also contemplated that, in one embodiment, may include storing a plurality of files, detecting a search operation to determine the presence of a given data pattern within a first file, and storing an indication of the given data pattern and an indication of result data of the search operation in a first record associated with the first file.

Figure 1:
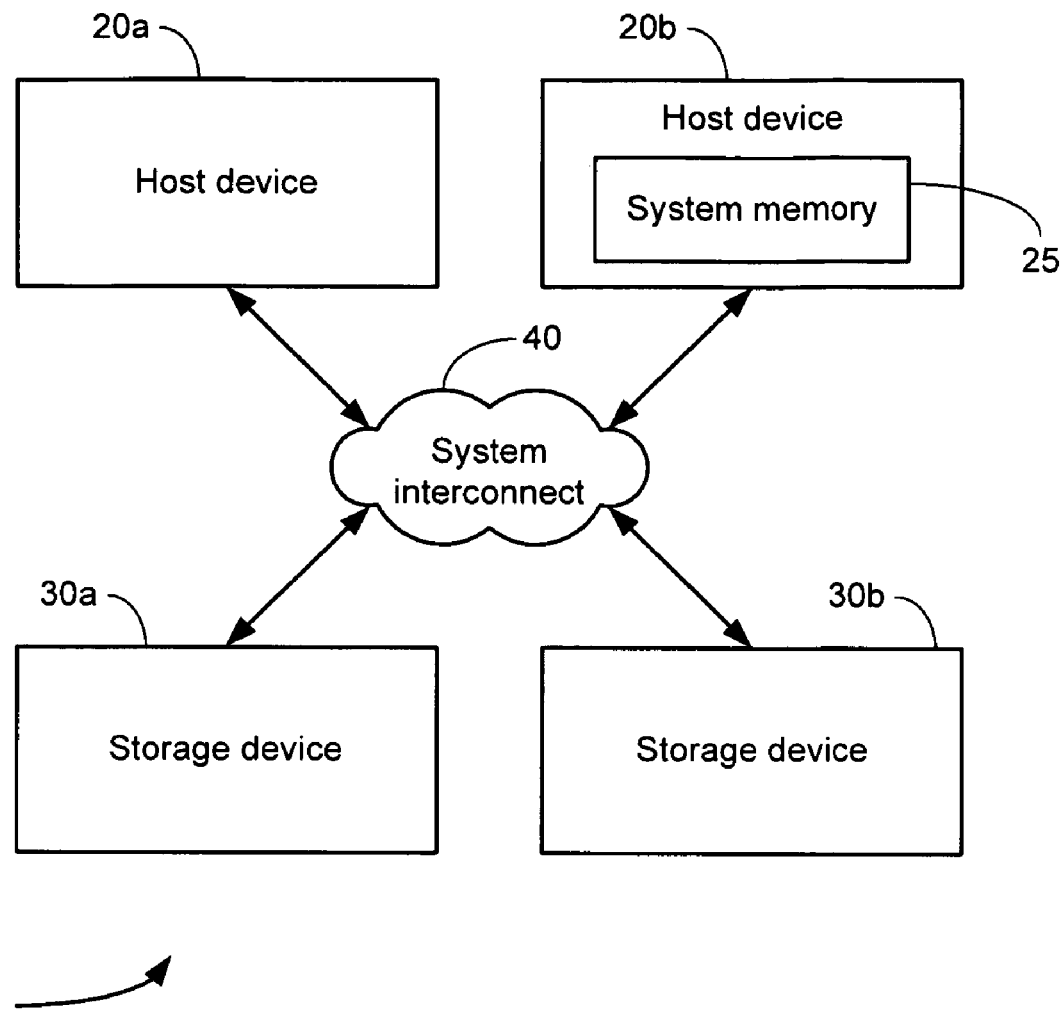
FIG. 1 is a block diagram illustrating one embodiment of a storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Storage System and File System Overview

Turning now to FIG. 1, a block diagram of one embodiment of a storage system is shown. In the illustrated embodiment, storage system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of storage system 10, host devices 20 may be configured to access data stored on one or more of storage devices 30. In one embodiment, storage system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of storage system 10 implemented within a single computer system, storage system 10 may be configured to provide most of the data storage requirements for one or more other computer systems (not shown), and may be configured to communicate with such other computer systems. In an alternative embodiment, storage system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of storage system 10 may facilitate scaling of storage system capacity as well as data bandwidth between host and storage devices.

In still another embodiment, storage system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that storage system 10 may have an arbitrary number of each of these types of devices in alternative embodiments. Also, in some embodiments of storage system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of storage system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in storage system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of storage system 10 as system memory 25. Further, a computer-accessible medium may include transmission media or signals such as electrical, electromagnetic, or digital signals, conveyed via a communication medium such as network and/or a wireless link, which may be included in some embodiments of storage system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix operating system, the Apple Macintosh operating system, or another suitable operating system. Additionally, a given host device may be configured to execute application programs such as word processors, web browsers and/or servers, email clients and/or servers, and multimedia applications, among many other possible applications.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored.

Many operating system embodiments provide data and control structures for organizing the storage space provided by storage devices 30 into files. In various embodiments, the data structures may include one or more tables configured to store information such as, for example, the identity of each file, its location within storage devices 30 (e.g., a mapping to a particular physical location within a particular storage device), as well as other information about each file as described in greater detail below. Also, in various embodiments, the control structures may include executable routines for manipulating files, such as, for example, function calls for changing file identity and for modifying file content as described in greater detail below. Collectively, these data and control structures may be referred to herein as a file system, and the particular data formats and protocols implemented by a given file system may be referred to herein as the format of the file system.

In some embodiments, a file system may be integrated into the operating system such that any access to data stored on storage devices 30 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 2.

Figure 2:
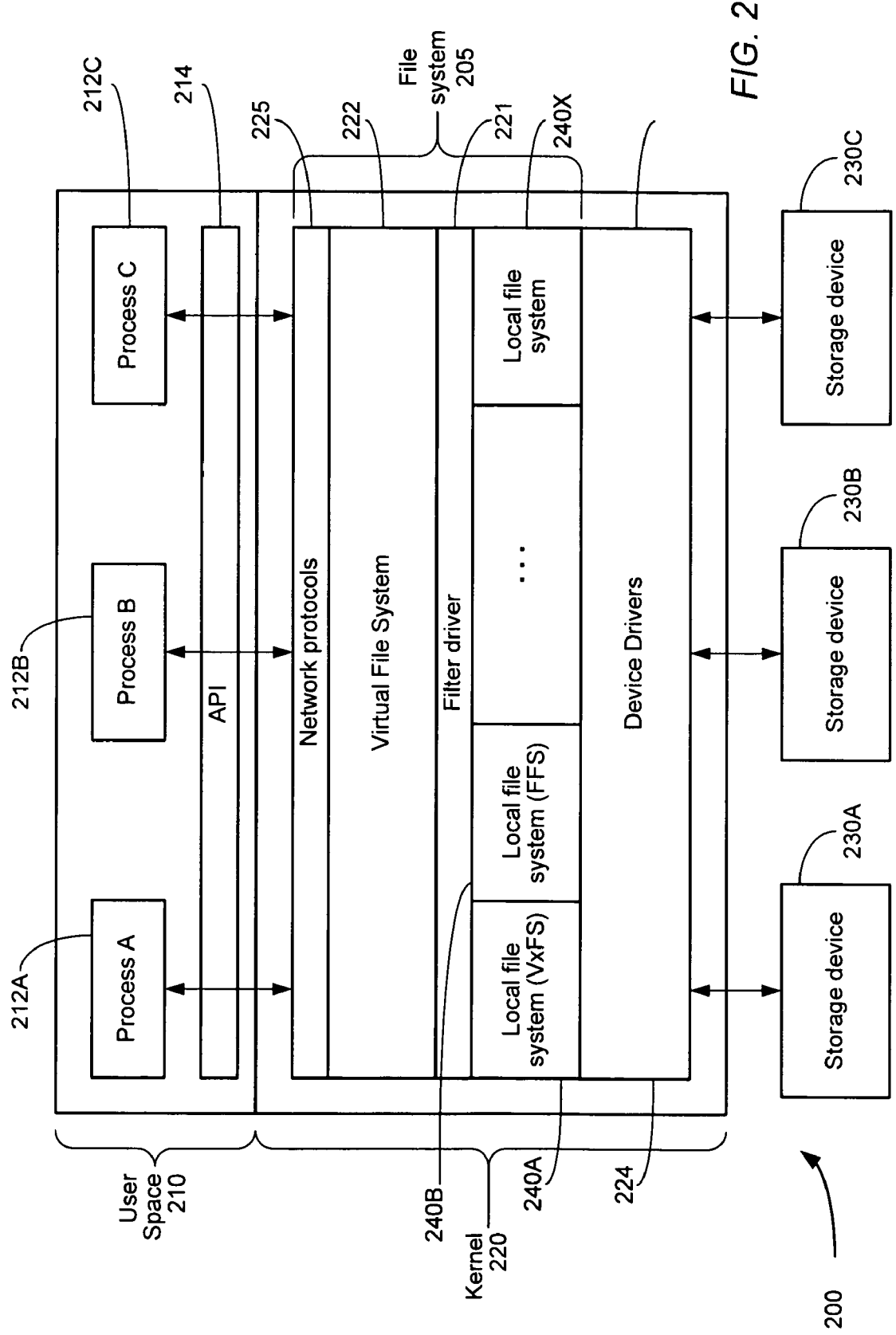
FIG. 2 is a block diagram illustrating one embodiment of an operating system architecture and its interface to storage devices.

FIG. 2 illustrates one embodiment of an operating system architecture and its interface to storage devices. In the illustrated embodiment, operating system 200 includes a user space 210 and a kernel space 220. User space 210 includes a plurality of processes 212A-C, each of which may correspond to a given user application. In some embodiments, some application processes 212 within user space 210 may be distinct from operating system 200. Such processes may be said to operate within an environment provided by operating system 200, or to operate "on top of" operating system 200. Each of processes 212 may be configured to access storage devices 230A-C through calls to application programming interface (API) 214. API 214 provides processes 212 with access to file system 205, which is configured to operate within kernel space 220. In one embodiment, storage devices 230 may be illustrative of storage devices 30 of FIG. 1. Also, in one embodiment, operating system 200, any of its components, and/or any of processes 212 may be configured to execute on one or more host devices 20 of FIG. 1, for example as program instructions and data stored within a computer-accessible medium such as system memory 25 of FIG. 1.

As described above with respect to storage system 10 of FIG. 1, a given host device 20 may reside in a different computer system from a given storage device 30, and may access that storage device via a network. Likewise, with respect to operating system 200, in one embodiment a given process such as process 212A may execute remotely and may access storage devices 230 over a network. In the illustrated embodiment, file system 200 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) proprietary format local file system 240A, a Berkeley fast file system (FFS) format local file system 240B, and a different proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 212 to a format applicable to the particular local file system 240 targeted by each operation. Additionally, in the illustrated embodiment operating system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

It is noted that filter driver 221 is part of file system 205 and not an application or process within user space 210. Consequently, filter driver 221 may be configured to operate independent of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 212. In such embodiments, processes executing in kernel space 220 may be configured to access file system 205 through a kernel-mode API (not shown), in a manner similar to user space processes 212. Thus, in some embodiments, all accesses to storage devices 230 may be processed by file system 205, regardless of the type or space of the process originating the access operation.

Numerous alternative embodiments of operating system 200 and file system 205 are possible and contemplated. For example, file system 205 may support different numbers and formats of local file systems 240, or only a single local file system 240. In some embodiments, network protocol 225 may be omitted or integrated into a portion of operating system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Optimizing File Search Operations

As described above, file system 205 may be configured to manage access to a plurality of files stored on storage devices 230. In some embodiments, operating system 200 and/or processes 212 may be configured to search one or more files to determine whether the searched files contain a particular data pattern. For example, an application program such as the Unix "grep", "egrep", or "fgrep" command or the Microsoft Windows operating system "file search" utility may be invoked to determine whether a particular text string occurs in a set of files. In some embodiments, search applications may be capable of specifying data patterns of arbitrary complexity, such as regular expressions, for example. Also, in some embodiments search applications may be configured to process binary data patterns and files in addition to textual patterns and files.

Once invoked, the search application may execute as one of processes 212, for example, and may generate read operations to file system 205 in order to retrieve the contents of the specified files. Depending on the search application, multiple files may be specified as the target of the search operation by providing multiple file names as arguments to the search application, using wildcards, specifying folder or directory names, or via any other suitable means. As the data from each specified file is retrieved via file system 205, the search application may examine the retrieved data to determine whether it includes the specified search data pattern, employing any suitable search algorithm. Depending on the implementation of the search application, searching of a given file may terminate after the first match or a specified number of matches (if any) of the search data pattern is detected, or may proceed until the end of the file is reached, reporting all matches detected. In some embodiments, these or other aspects of search application functionality may be selected by a user via command-line arguments, menus, or similar means.

In some conventional embodiments, search applications may result in the entirety of each specified file being read, even if an identical search (i.e., specifying the same data pattern and target file set) has already been performed. Redundantly accessing files under such circumstances may potentially increase file system activity and decrease overall system performance. For example, in such embodiments, two successive searches for the same pattern in the same file may each result in all corresponding file data being read and searched twice, which may take substantially longer processing time than performing the search a single time.

Figure 3:
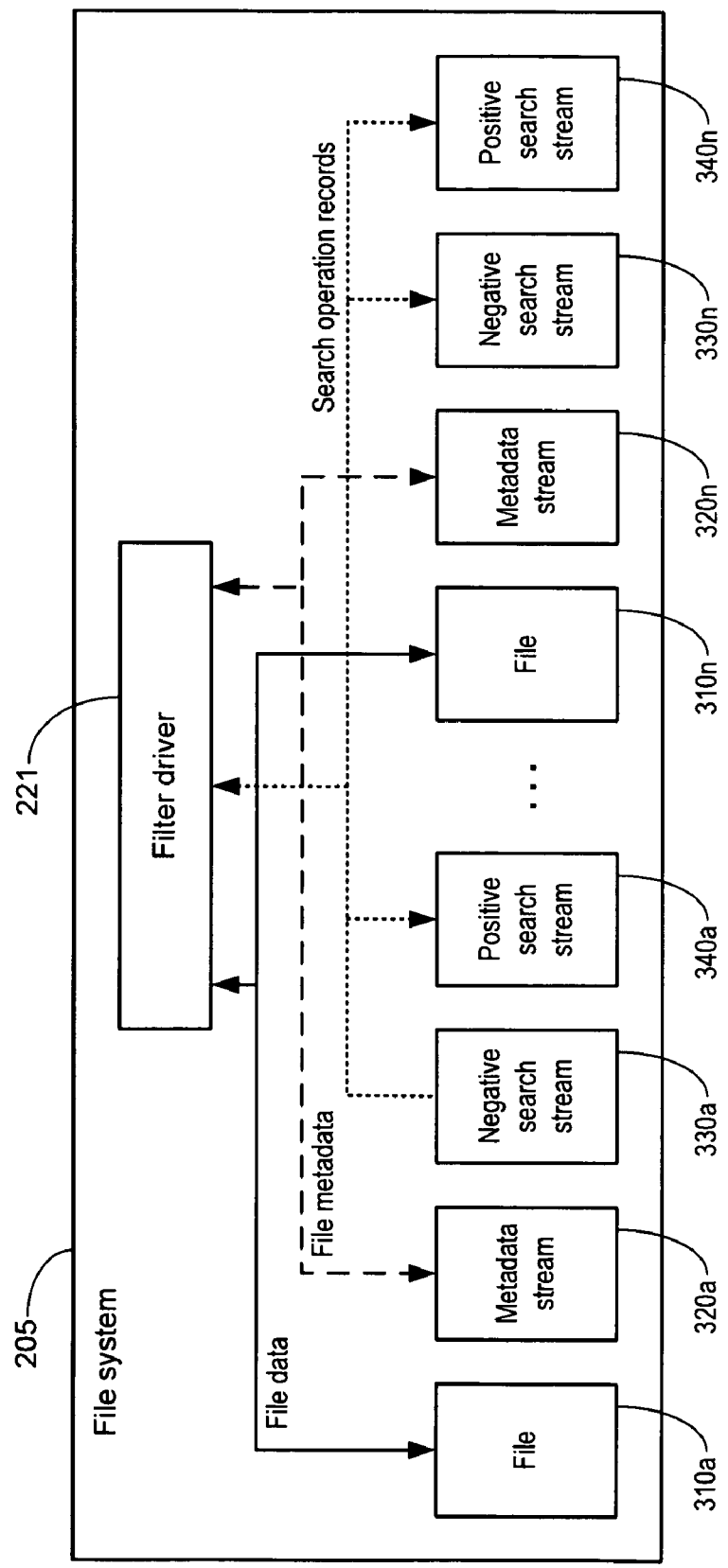
FIG. 3 is a block diagram illustrating one embodiment of a file system configured to detect search operations on files and to store corresponding records.

In one embodiment, file system 205 may be configured to detect search operations on files, and to store data patterns specified by such search operations as well as search result data in records corresponding to searched files. FIG. 3 illustrates one such embodiment of a file system. The embodiment of file system 205 shown in FIG. 3 may include those elements illustrated in the embodiment of FIG. 2; however, for sake of clarity, some of these elements are not shown. In the illustrated embodiment, file system 205 includes filter driver 221, an arbitrary number of files 310a, n, and a Respective metadata named stream 320a, n associated with each of files 310a, n. File system 205 further includes a respective negative search named stream 330a, n and a respective positive search named stream 340a, n associated with each of files 310a, n. It is noted that a generic instance of one of files 310a, n or named streams 320a, n, 330a, n or 340a, n may be referred to respectively as a file 310 or named stream 320, 330 or 340, and that files 310a, n and named streams 320a, n, 330a, n or 340a, n may be referred to collectively as files 310 and named streams 320, 330 or 340, respectively.

Files 310 may be representative of files managed by file system 205. Each of files 310 has a corresponding metadata named stream 320, which may be referred to simply as metadata 320. Each of metadata named streams 320 may be configured to store information about its corresponding file, which may be referred to herein as metadata. In various embodiments, metadata may include information such as (but not limited to) the file identity, size, ownership, and file access permissions, as well as records corresponding to detected search operations, as described below. In the illustrated embodiment, filter driver 221 may be configured to coordinate the reading and writing of file data for files 310 and of file metadata for corresponding metadata streams 320.

Additionally, in the illustrated embodiment, each of files 310 has a corresponding negative search named stream 330, which may be referred to simply as negative stream 330, and a corresponding positive search named stream 340, which may be referred to simply as positive stream 340. Each of negative streams 330 and positive streams 340 may be configured to store information relating to search operations performed on the corresponding file 310, as described in greater detail below. In the illustrated embodiment, filter driver 221 may be configured to coordinate the reading and writing of such search operation records for negative streams 330 and positive streams 340.

It is noted that files 310, metadata 320, negative streams 330 and positive streams 340 may be physically stored on one or more storage devices, such as storage devices 230 of FIG. 2. However, for purposes of illustration, each of these elements is shown as conceptually residing within file system 205.

Storing Records of File Operations and Detecting Search Operations

In some embodiments of file system 205, filter driver 221 may be configured to detect various operations, such as read or write operations to a given file received by file system 205 from various applications. Subsequent to detecting an operation destined for a particular file 310, filter driver 221 may be configured to store a record of the detected operation in metadata 320 corresponding to the targeted file 310. In various embodiments, the record stored by filter driver 221 subsequent to detecting a file operation may include various kinds of information about the targeted file 310 and the operation detected, such as the file identity, file type, operation type, file size, file content signature (such as, e.g., a hash or Message Digest 5 (MD5) signature), file owner, and/or file permissions, for example. Additionally, the record may include information about the process or application originating the operation, such as the application name, invocation arguments, process ID, or other available information.

In one particular embodiment, file system 205 may be configured to detect a search operation to determine whether a given data pattern is present within one or more files. For example, filter driver 221 may be configured to detect that a particular file read operation was generated by a search application by examining the name of the application originating the operation and/or the arguments with which the application was invoked. In some embodiments, filter driver 221 may be configured with a list of names of search applications, and may determine that a file read application received from one of the listed applications is a search operation. In such embodiments, it is noted that filter driver 221 may be able to detect a search operation without any specific action by or modification of the search application; i.e., detection of the search operation may be transparent to the search application. In other embodiments, filter driver 221 may provide a facility, such as a registration application programming interface (API), through which applications may register themselves as search applications, thus allowing filter driver 221 to recognize arbitrary search applications by name or other identifying data. In still other embodiments, filter driver 221 may be configured to provide an API specific to search operations, such as by providing an alternative set of function calls for invoking file operations, or by providing one or more mechanisms for overloading standard file operation function calls with search-specific semantics. In such embodiments, a given search application may use the search-specific API to interact with file system 205 when performing search-related file operations, and filter driver 221 may detect operations received via such an API as search operations. Numerous other mechanisms via which file system 205 may be configured to detect search operations are possible and contemplated.

Once a search operation destined for a particular file 310 has been detected, filter driver 221 may be configured to store a record of the search operation in corresponding metadata named stream 320. It is contemplated that storage of such a record may take place at any time subsequent to detection of the relevant operation. For example, in one embodiment, storage of the record may be delayed until the operation on file 310a is complete, while in another embodiment, storage of the record may occur prior to completion of the operation. In the latter case, if the operation is not guaranteed to complete (i.e., is speculative), filter driver 221 may provide a mechanism to delete a record stored in advance of its corresponding operation in case the operation does not complete.

In one embodiment, the record stored by filter driver 221 subsequent to detecting a search operation may be generated and stored in Extensible Markup Language (XML) format, although it is contemplated that in other embodiments, any suitable format may be used. One example of an XML-format record is as follows:

```
<record sequence="3">
    <path>/test1/foo.txt</path>
    <type>ascii</type>
    <user id=1598>username</user>
    <group id=119>groupname</group>
    <perm>rw-r--r--</perm>
    <md5>d41d8cd98f00b204e9800998ecf8427e</md5>
    <size>58937</size>
    <process>
        <name>grep</name>
        <args>grep release4 /test1/*.txt</args>
        <pid>7168</pid>
        <ppid>409</ppid>
        <pgrpid>409</pgrpid>
    </process>
</record>
```

Such a record may be appended to the metadata named stream (for example, metadata 320a) associated with the file (for example, file 310a) having the file identity "/test1/foo.pdf" subsequent to search application "grep" being invoked with the arguments "grep release4 /test1/*.txt". As described above, in one embodiment filter driver 221 may be configured to detect this operation as a search operation by detecting "grep" as the originating process name, while in other embodiments such detection may occur using a different method. This particular invocation of the "grep" search application may search each file with the extension ".txt" residing in the "/test1" directory for the text pattern "release4". In one embodiment, the wildcard expression "/test1/*.txt" may be expanded to an explicit list of files satisfying the expression by a preprocessor (such as a shell environment or command processor) before file system 205 receives a search operation corresponding to a particular file, such as "/test1/foo.txt". In another embodiment, file system 205 may be configured to expand wildcard expressions internally.

For this example, the number associated with the "record sequence" field indicates that this record is the third record associated with file 310a. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 310a in a format specific to the file system 205 and/or the operating system. The "md5" field records an MD5 signature corresponding to the file contents, and the "size" field records the length of file 310a in bytes.

Additionally, the "process" field may include subfields recording information about the process performing the content access operation. The "name" subfield records the name of the process or application originating the operation, and the "args" subfield records the arguments given when the named process was invoked. The "pid," "ppid," and "pgrpid" subfields record the process ID, the ID of the parent of the process, and the group ID of the process, respectively. It is contemplated that in alternative embodiments, filter driver 221 may store records corresponding to detected search operations that include more or fewer fields, as well as fields having different definitions and content. It is further contemplated that in some embodiments, filter driver 221 may detect a search operation and process it as described below without generating a record within metadata stream 320 as shown above.

Processing Search Operations Within the File System

In the illustrated embodiment, file system 205 may be configured to utilize information stored in negative stream 330 and positive stream 340 to optimize processing of detected search operations on corresponding file 310. Specifically, negative stream 330 may be configured to store records, such as XML records illustrated below, that indicate whether a given search data pattern is known not to exist within its corresponding file 310. Similarly, positive stream 340 may be configured to store records that indicate that a given search data pattern is known to exist within corresponding file 310 as well as the location(s) within file 310 at which the search data pattern is found.

Upon detecting a search operation as described above, in one embodiment filter driver 221 may be configured to determine the data pattern specified by the search operation. For example, filter driver 221 may examine the arguments with which the application originating the search operation was invoked and parse those arguments according to the application's syntax. Referring to the example described above, filter driver 221 may determine that the data pattern specified for the "grep" operation is the text string "release4". As noted previously, in some embodiments the data pattern may include wildcards, regular expression syntax, or other abstract pattern-matching syntax.

After determining the data pattern specified by the search operation, in one embodiment filter driver 221 may be configured to scan negative stream 330 and positive stream 340 to determine whether an indication of the specified data pattern is stored in either stream. In some embodiments, filter driver 221 may be configured to match the specified data pattern against the contents of negative stream 330 and positive stream 340 literally. In embodiments where the specified data pattern may include abstract syntax, filter driver 221 may be configured to evaluate the syntax as well as the syntax of the contents of streams 330 and 340 to determine whether an indication of the specified data pattern is stored in either stream. For example, two literally distinct regular expressions may identify the same data pattern when evaluated.

If an indication of the specified data pattern is not stored in either stream, in one embodiment filter driver 221 may be configured to search the file 310 targeted by the detected search operation to determine whether the specified data pattern exists therein. For example, in one embodiment filter driver 221 or another module within file system 205 may implement a search algorithm that may be executed within kernel space 220 of FIG. 2. In another embodiment, filter driver 221 may be configured to call an external search application that may be executed within user space 210 of FIG. 2. In some such embodiments, the external search application to be called may be selected when file system 205 is initialized or as desired by a programmer or system administrator, such as through an API.

If no match for the specified data pattern is found after filter driver 221 searches file 310, in one embodiment filter driver 221 may be configured to store an indication of the data pattern within negative stream 330. In one embodiment, filter driver 221 may store the data pattern as an XML record within negative stream 330. For example, if the pattern "release4"

mentioned in the example illustrated above is not found after filter driver 221 searches file "foo.txt", filter driver 221 may store the record ---
```
<pattern>release4</pattern>
```
--- within the corresponding negative stream 330.

Similarly, if a match for the specified data pattern is found after filter driver 221 searches file 310, in one embodiment filter driver 221 may be configured to store an indication of the data pattern within positive stream 340, as well as information regarding where the pattern was found within file 310. In one embodiment, filter driver 221 may store the data pattern as an XML record within positive stream 340. For example, the pattern "release4" mentioned in the example illustrated above may occur within file "foo.txt" at line 20 and line 485 of the file. Further, line 20 may be located within block 2 of the file and line 485 may be located within block 4 of the file, where block dimensions and boundaries are determined by file system 205 (e.g., file system 205 may organize and manipulate file contents using 1024-byte blocks). In such a case, after searching for the pattern "release4" in file "foo.txt", filter driver 221 may store the following XML record within the corresponding positive stream 340:

---
```
<occurs>
    <pattern>release4</pattern>
    <record>
        <linenumber>20</linenumber>
        <blocknumber>2</blocknumber>
    </record>
    <record>
        <linenumber>485</linenumber>
        <blocknumber>4</blocknumber>
    </record>
</occurs>
```
---

Any suitable index in addition to or in place of line and block numbers may be employed to index corresponding portions of a file. For example, in some embodiments, byte offsets measured from the beginning of the file may be used in place of line and block numbers in records such as the one just shown. Also, it is contemplated that in other embodiments, different XML tags may be used to delimit and structure the records stored in negative stream 330 and positive stream 340, or a syntax other than XML may be used to structure the records. It is further contemplated that in some embodiments, the target file 310 of a search operation may not be formatted as a text file (e.g., file 310 may be a binary file). In some such embodiments, if a given target file 310 is not a text file, line numbers may not be relevant to indexing the file, and they may be omitted from records within corresponding positive stream 340.

As described above, in one embodiment filter driver 221 may be configured to scan negative stream 330 and positive stream 340 after receiving a search operation to determine whether an indication of the specified search data pattern is stored in either stream. For an embodiment employing the format of the example records just shown, filter driver 221 may be configured to scan the "pattern" fields recorded in each stream. If the specified data pattern matches a pattern stored in negative stream 330, filter driver 221 may be configured to return a negative search indication to the application originating the search operation without accessing the contents of corresponding file 310. For example, filter driver 221 may indirectly and transparently return a negative search indication to an originating application by causing an end-of-file indication to be sent to the originating application without any file data; i.e., filter driver 221 may cause file 310 to appear to be of null length to the originating application. In such a case, the originating application may attempt to search the null file data returned by file system 205 for the specified search data pattern, which attempt may fail provided that the null pattern is not a valid match for the search data pattern. In another embodiment, filter driver 221 may indirectly and transparently return a negative search indication to an originating application by returning data of the same length as file 310, but wherein the returned file data includes only whitespace characters (e.g., spaces, tabs) and/or newline characters.

In embodiments where file system 205 implements a search-specific API as described above, filter driver 221 may be configured to directly indicate negative search results to originating applications, for example through a function call or other defined interface, rather than by returning an end-of-file indication. It is noted that regardless of the specific mechanism by which negative search results are indicated to an originating search application, those negative search results may be indicated without actually accessing the contents of the targeted file 310, thus potentially reducing file system activity.

If the specified data pattern matches a pattern stored in positive stream 340, filter driver 221 may be configured to access only those portions of file 310 indicated by the matching record in positive stream 340, and to return those portions of file data to the originating application. In one embodiment, filter driver 221 may be configured to transparently return those specific file portions by returning whitespace characters (e.g., spaces, tabs) and/or newline characters up until the line or block indicated in the matching record in positive stream 340, and then reading the indicated block of corresponding file 310 and returning file data for only that block to the originating application. If a given data pattern matches multiple times in a given file 310, as indicated by multiple records corresponding to the data pattern such as illustrated above, filter driver 221 may follow a given returned data block with additional whitespace and/or newline characters until the next line or block indicated by a record is reached. For example, if a search operation specifies the data pattern "release4" and a positive stream 340 contains an "occurs" record as illustrated above, filter driver 221 may be configured to access and return only blocks 2 and 4 of corresponding file 310, interspersing these blocks with the appropriate number of whitespace and/or newline characters. The originating search application may attempt to search the whitespace/newline-padded file data returned by file system 205 for the specified data pattern, but may only match that data pattern in the portions of the targeted file 310 actually returned by file system 205, provided that the characters used to substitute for unread portions are not valid search pattern data.

In embodiments where file system 205 implements a search-specific API as described above, filter driver 221 may be configured to directly indicate positive search results to originating applications. For example, in one such embodiment, filter driver 221 may be configured to return specific portions of a file 310 as well as information on where the specific portions are located within file 310 through a function call or other defined interface, rather than by returning such portions embedded in a stream of whitespace characters. As with negative search results described above, it is noted that regardless of the specific mechanism by which positive search results are indicated to an originating search application, those positive search results may be indicated while actually accessing only portions of the targeted file 310, thus potentially reducing file system activity.

If the contents of a given file 310 are modified, for example by a file write operation, the data patterns stored in corresponding negative stream 330 and positive stream 340 may no longer accurately reflect the modified file contents. That is, the stored data patterns may no longer exhibit referential integrity with respect to the modified contents of given file 310, as the information to which the stored data patterns referred at the time the data patterns were stored may have changed. In some embodiments, filter driver 221 may be configured to clear the records stored in negative stream 330 and positive stream 340 following a write to the corresponding file 310, for example by truncating the streams 330 and 340 to zero length. In other embodiments, filter driver 221 may be configured to examine stored data patterns against the modified contents to determine the validity of each stored record following modification of file content. For example, in one such embodiment filter driver 221 may search file 310 for each data pattern stored in negative stream 330 and positive stream 340, and may update the streams accordingly. Additionally, in some embodiments, filter driver 221 may be configured to remove records from negative stream 330 and positive stream 340 to reduce storage required by the streams. For example, filter driver 221 may be configured to remove older records from a given stream if the size of the stream exceeds a threshold or after a period of time has elapsed.

It is noted that the order in which negative stream 330 and positive stream 340 are searched may vary in various embodiments. In one embodiment, subsequent to detecting a search operation, filter driver 221 may be configured to first search for the specified data pattern in negative stream 330. If the pattern is not found, filter driver 221 may next search positive stream 340, and may finally search the specified file 310 itself. In another embodiment, filter driver 221 may be configured to search some or all of negative stream 330, positive stream 340, and file 310 concurrently, or in a different order. Further, in some embodiments of file system 205 that provide a search-specific API, the order and degree of concurrency in which these items are searched may be specified by a search application. For example, such specification may occur in response to heuristics that may suggest whether a given data pattern is more likely to be found or not found in a given file, and thus more likely in a positive or negative stream, or whether a given search is known to have or have not been recently performed, and thus whether a data pattern is likely to exist in either stream.

It is further noted that in some embodiments, file system 205 may implement support for one of negative stream 330 or positive stream 340, but not the other, or may implement the management of negative stream 330 and/or positive stream 340 described above in a module other than filter driver 221. Additionally, in some embodiments, negative stream 330 and/or positive stream 340 may be omitted entirely, and records corresponding to negative and positive search results may be stored directly within metadata stream 320 or another named stream. In such embodiments, the records may be delimited with XML field tags other than those illustrated above, in order to distinguish positive search records from negative search records.

Finally, it is contemplated that various types of indexing may be applied to the contents of a given negative stream 330 or positive stream 340, or to the search-related contents of file system 205 as a whole. For example, in one embodiment file system 205 may be configured to index the records stored in a given negative stream 330 or positive stream 340 such as by pre-parsing the syntax of the records stored therein and storing the record data in a parsed format (such as a binary format), thus reducing the time needed to search a given stream. Additionally, in one embodiment file system 205 may be configured to generate and maintain additional named streams or files that index existing negative streams 330 and positive streams 340. For example, file system 205 may be configured to generate a negative index stream including records of particular negative streams 330 in which a given search data pattern is determined to occur, as well as a similar positive index stream. File system 205 may be further configured to use such index streams to reduce the number of accesses to negative streams 330 and positive streams 340 in response to search activity, in a manner similar to that in which a given negative stream 330 and a given positive stream 340 may reduce accesses to their corresponding file 310 as described above.

Figure 4:
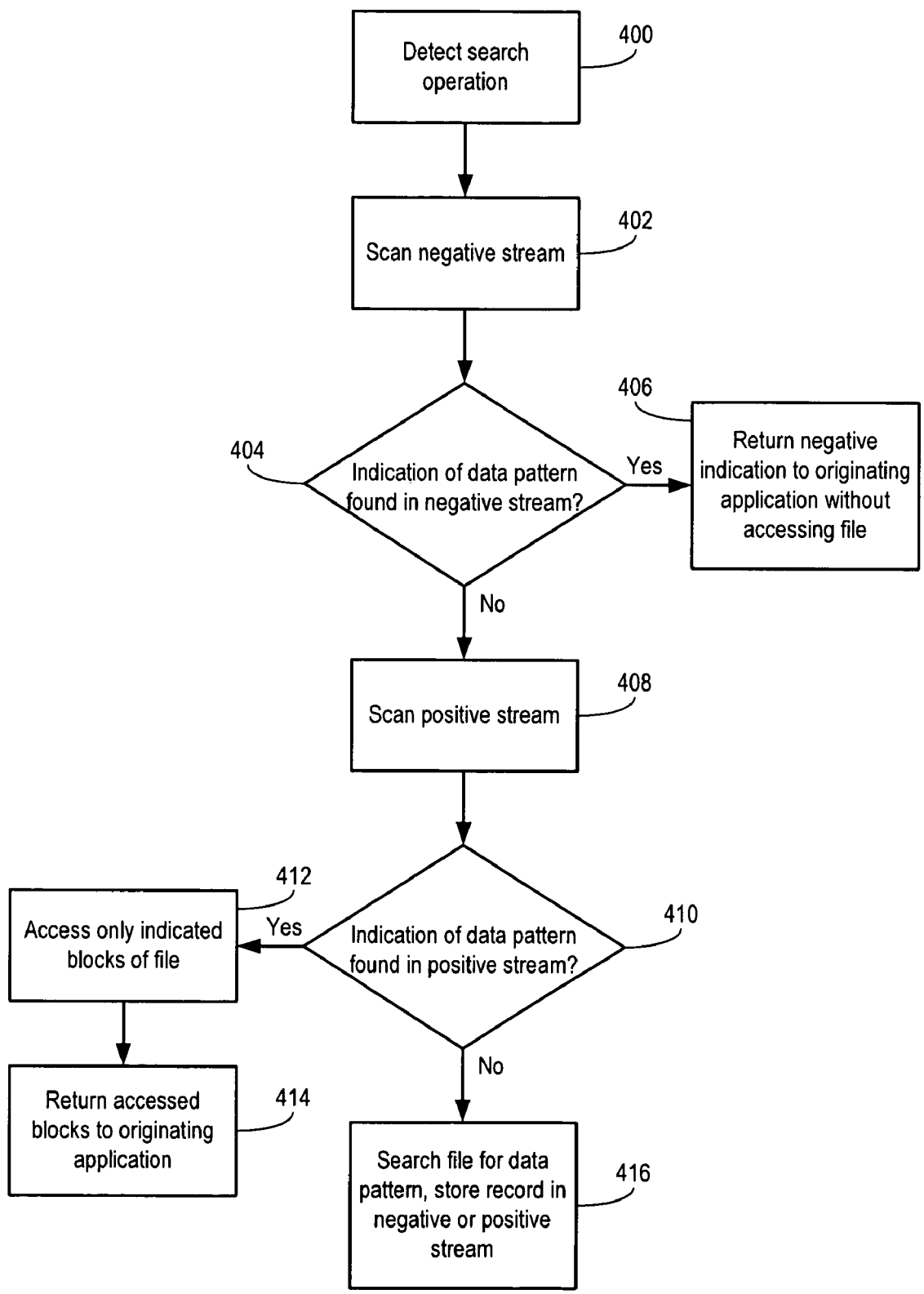
FIG. 4 is a flow diagram illustrating one embodiment of a method of detecting search operations on files and storing corresponding records.

FIG. 4 illustrates one embodiment of a method of detecting a search operation on a file and storing records corresponding to the search operation. Referring collectively to FIG. 1 through FIG. 4, operation begins in block 400 where an operation to search for a data pattern in a given file is detected. For example, in one embodiment filter driver 221 may detect a file read operation on a given file 310 originating from an application whose name corresponds to a known search application. In other embodiments, file system 205 may provide an API whereby a search application may submit a search operation to file system 205.

When a search operation is detected, in one embodiment negative stream 330 may be scanned to determine whether an indication of the data pattern specified by the search operation is stored therein (blocks 402, 404). If an indication of the specified data pattern is stored therein, a negative indication may be returned to the originating application without accessing corresponding file 310 (block 406). For example, filter driver 221 may be configured to return an end-of-file indication to the originating application in this case, or may indicate negative search status via an API.

If no indication of the specified data pattern is detected in negative stream 330, in one embodiment positive stream 340 may be scanned to determine whether such an indication is stored in a record therein (blocks 408, 410). If such an indication is found, only the data blocks of file 310 indicated by the record may be accessed (block 412). Those data blocks may be returned to the originating application (block 414). For example, in one embodiment, the data blocks may be returned in a manner transparent to the originating application by embedding them in a stream of whitespace characters generated by filter driver 221. In another embodiment, the data blocks may be returned directly to the originating application along with information regarding their location within the file, such as through an API.

If no indication of the specified data pattern is detected in positive stream 340, the corresponding file 310 may be searched to determine whether the data pattern is stored therein, and the appropriate record may be stored in negative stream 330 or positive stream 340 dependent on the result of the search (block 416).

It is noted that in some embodiments of the method, negative stream 330, positive stream 340, and file 310 may be searched in a different order or concurrently. It is further noted that in some embodiments of the method, only one or the other of negative stream 330 and positive stream 340 may be implemented, or both types of records may be combined in a single named stream.

Figure 5:
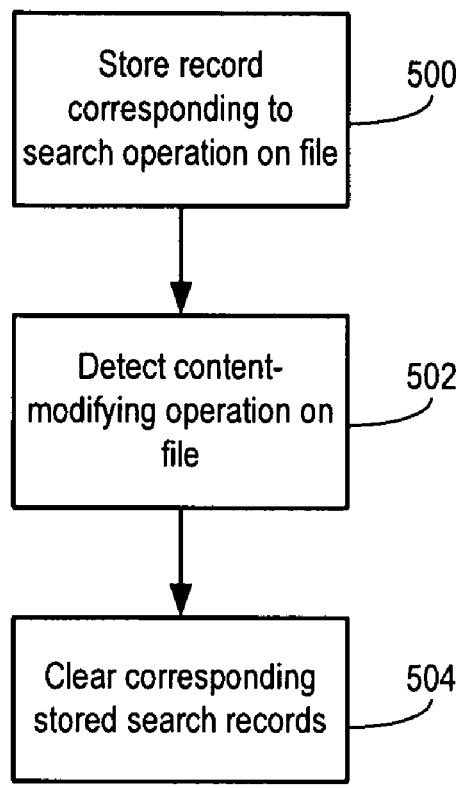
FIG. 5 is a flow diagram illustrating one embodiment of a method of maintaining the referential integrity of stored records corresponding to a search operation.

FIG. 5 illustrates one embodiment of a method of maintaining the referential integrity of stored records corresponding to a search operation. Referring collectively to FIG. 1 through 3 and FIG. 5, operation begins in block 500 where a record corresponding to a file search operation is stored. For example, a search operation may be detected and a corresponding record including the search data pattern may be stored in a negative stream 330 or a positive stream 340, as described above in conjunction with the descriptions of FIGS. 3 and 4.

Subsequent to storage of a record of a file search operation, an operation to modify the content of the corresponding file may be detected (block 502). For example, in one embodiment filter driver 221 may detect a file write operation to a file having records stored in a corresponding negative stream 330 or positive stream 340.

Upon detection of a content-modifying operation on a file, stored search records corresponding to that file may be cleared (block 504). For example, in one embodiment filter driver 221 may be configured to truncate negative stream 330 and positive stream 340 to zero length upon detecting a content-modifying operation, such as a file write operation, on corresponding file 310. In an alternative embodiment, it is contemplated that each stored search record may be examined, for example by filter driver 221, to assess its referential integrity following detection of a content-modifying operation. In such an embodiment, only those records whose integrity is affected by the content-modifying operation may be cleared.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a computer-accessible storage device configured to store file system content, said file system content comprising a plurality of files and a plurality of metadata records associated with said files; and
   a host computing device configured to implement an operating system including a file system, wherein said file system comprises data structures configured to store information about said file system content, and wherein said file system further comprises executable routines configured to access and modify said file system content, wherein said executable routines of said file system are configured to store said file system content to said computer-accessible storage device and to manage accesses to file system content stored by said computer-accessible storage device, wherein said accesses are generated by applications distinct from said operating system, and wherein said file system is further configured to:
   detect a given search operation generated by a first one of said applications, wherein the given search operation is operable to determine whether or not a given data pattern that is specified by the given search operation occurs within a first one of said files stored on said computer-accessible storage device;
   in response to detecting said given search operation, access said computer-accessible storage device to determine whether one or more of said metadata records associated with said first file indicate a result of a previously detected search operation, wherein the previously detected search operation is detected by said file system prior to said given search operation, wherein the previously detected search operation is operable to determine whether or not a particular data pattern that is specified by the previously detected search operation occurs within said first file, and wherein the particular data pattern specified by the previously detected search operation includes the given data pattern specified by the given search operation;
   in response to determining that said one or more of said metadata records indicate said result of said previously detected search operation, return a result of said given search operation to said first application dependent upon said result of said previously detected search operation without retrieving the entirety of said first file from said computer-accessible storage device; and
   in response to determining that said one or more metadata records associated with said first file do not indicate a result of a previously detected search operation to determine the presence of a data pattern including said given data pattern within said first file, instruct that said first file be searched to determine the presence of said given data pattern within said first file and subsequently store an indication, within one or more of said metadata records associated with said first file, of a result of instructing that said first file be searched.

2. The system as recited in claim 1, wherein in response to determining that said one or more of said metadata records indicate said result of said previously detected search operation, said file system is further configured to determine whether said result of said previously detected search operation indicates that said given data pattern is present within said first file, and in response to determining that said given data pattern is present within said first file according to said result of said previously detected search operation, said file system is further configured to access said computer-accessible storage device to retrieve only a portion of said first file and to return said retrieved portion to said first application as said result of said given search operation.

3. The system as recited in claim 1, wherein said one or more of said metadata records that indicate said result of said previously detected search operation include an index corresponding to one or more portions of said first file in which said given data pattern occurs, and wherein in response to determining that said one or more of said metadata records indicate said result of said previously detected search operation, said file system is further configured to determine whether said result of said previously detected search operation indicates that said given data pattern is present within said first file, and in response to determining that said given data pattern is present within said first file according to said result of said previously detected search operation, said file system is further configured to access said computer-accessible storage device to retrieve only the one or more portions of said first file corresponding to said index and to return said one or more retrieved portions to said first application as said result of said given search operation.

4. The system as recited in claim 1, wherein in response to determining that said one or more of said metadata records indicate said result of said previously detected search operation, said file system is further configured to determine whether said result of said previously detected search operation indicates that said given data pattern is not present within said first file, and in response to determining that said given data pattern is not present within said first file according to said result of said previously detected search operation, said file system is further configured to return a negative indication to said first application as said result of said given search operation without accessing said computer-accessible storage device to retrieve any portion of said first file.

5. The system as recited in claim 1, wherein to store said indication of said result of said instructing that said first file be searched, if said given data pattern is determined to be present in said first file, said file system is further configured to store an indication of said given data pattern and pattern location information in a metadata record within a positive search named stream associated with said first file and stored on said computer-accessible storage device, and wherein if said given data pattern is determined not to be present in said first file, said file system is further configured to store said indication of said given data pattern in a metadata record within a negative search named stream associated with said first file and stored on said computer-accessible storage device.

6. The system as recited in claim 1, wherein in response to detecting an operation to modify data stored in said first file, said file system is further configured to clear metadata records associated with said first file that indicate results of previously detected search operations corresponding to said first file.

7. The system as recited in claim 1, wherein to instruct that said first file be searched to determine the presence of said given data pattern within said first file, said file system is further configured to call an external search application configured to execute within user space.

8. The system as recited in claim 1, wherein to instruct that said first file be searched to determine the presence of said given data pattern within said first file, said file system is further configured to execute a search algorithm within kernel space.

9. A method, comprising:
   a file system storing file system content to a computer-accessible storage device, said file system content comprising a plurality of files and a plurality of metadata records associated with said files, wherein said file system is implemented by an operating system executing on a host computing device, wherein said file system comprises data structures configured to store information about said file system content, and wherein said file system further comprises executable routines configured to access and modify said file system content;
   said file system managing accesses to said computer-accessible storage device, wherein said accesses are generated by applications distinct from said operating system;
   said file system detecting a given search operation generated by a first one of said applications, wherein the given search operation is operable to determine whether or not a given data pattern that is specified by the given search operation occurs within a first one of said files stored on said computer-accessible storage device;
   in response to detecting said given search operation, said file system accessing said computer-accessible storage device and determining whether one or more of said metadata records associated with said first file indicate a result of a previously detected search operation, wherein the previously detected search operation is detected by said file system prior to said given search operation, wherein the previously detected search operation is operable to determine whether or not a particular data pattern that is specified by the previously detected search operation occurs within said first file, and wherein the particular data pattern specified by the previously detected search operation includes the given data pattern specified by the given search operation;
   in response to determining that said one or more of said metadata records indicate said result of said previously detected search operation, said file system returning a result of said given search operation to said first application dependent upon said result of said previously detected search operation without retrieving the entirety of said first file from said computer-accessible storage device; and
   in response to determining that said one or more metadata records associated with said first file do not indicate a result of a previously detected search operation to determine the presence of a data pattern including said given data pattern within said first file, said file system instructing that said first file be searched to determine the presence of said given data pattern within said first file and said file system subsequently storing an indication, within one or more of said metadata records associated with said first file, of a result of said instructing that said first file be searched.

10. The method as recited in claim 9, further comprising:
    in response to determining that said one or more of said metadata records indicate said result of said previously detected search operation, said file system determining whether said result of said previously detected search operation indicates that said given data pattern is present within said first file; and
    in response to determining that said given data pattern is present within said first file according to said result of said previously detected search operation, said file system accessing said computer-accessible storage device to retrieve only a portion of said first file and returning said retrieved portion to said first application as said result of said given search operation.

11. The method as recited in claim 9, wherein said one or more of said metadata records that indicate said result of said previously detected search operation include an index corresponding to one or more portions of said first file in which said given data pattern occurs, and wherein the method further comprises:
    in response to determining that said one or more of said metadata records indicate said result of said previously detected search operation, said file system determining whether said result of said previously detected search operation indicates that said given data pattern is present within said first file;
    in response to determining that said given data pattern is present within said first file according to said result of said previously detected search operation, said file system accessing said computer-accessible storage device to retrieve only the one or more portions of said first file corresponding to said index; and
    said file system returning said one or more retrieved portions to said first application as said result of said given search operation.

12. The method as recited in claim 9, further comprising:
    in response to determining that said one or more of said metadata records indicate said result of said previously detected search operation, said file system determining whether said result of said previously detected search operation indicates that said given data pattern is not present within said first file; and
    in response to determining that said given data pattern is not present within said first file according to said result of said previously detected search operation, said file system returning a negative indication to said first application as said result of said given search operation without accessing said computer-accessible storage device to retrieve any portion of said first file.

13. The method as recited in claim 9, wherein said file system storing said indication of said result of said instructing that said first file be searched further comprises:
   if said given data pattern is determined to be present in said first file, said file system storing an indication of said given data pattern and pattern location information in a metadata record within a positive search named stream associated with said first file and stored on said computer-accessible storage device; and
   if said given data pattern is determined not to be present in said first file, said file system storing said indication of said given data pattern in a metadata record within a negative search named stream associated with said first file and stored on said computer-accessible storage device.

14. The method as recited in claim 9, further comprising said file system clearing metadata records associated with said first file that indicate results of previously detected search operations corresponding to said first file, in response to said file system detecting an operation to modify data stored in said first file.

15. The method as recited in claim 9, wherein said file system instructing that said first file be searched to determine the presence of said given data pattern within said first file comprises said file system calling an external search application configured to execute within user space.

16. A computer-accessible storage medium comprising program instructions, wherein the program instructions are computer-executable to implement:
   a file system of an operating system storing file system content to a computer-accessible storage device, said file system content comprising a plurality of files and a plurality of metadata records associated with said files, wherein said file system comprises data structures configured to store information about said file system content, and wherein said file system further comprises executable routines configured to access and modify said file system content;
   said file system managing accesses to said computer-accessible storage device, wherein said accesses are generated by applications distinct from said operating system;
   said file system detecting a given search operation generated by a first one of said applications to determine the presence of a given data pattern within a first one of said files stored on said computer-accessible storage device;
   in response to detecting said given search operation, said file system accessing said computer-accessible storage device and determining whether one or more of said metadata records associated with said first file indicate a result of a previously detected search operation, wherein the previously detected search operation is detected by said file system prior to said given search operation, wherein the previously detected search operation is operable to determine whether or not a particular data pattern that is specified by the previously detected search operation occurs within said first file, and wherein the particular data pattern specified by the previously detected search operation includes the given data pattern specified by the given search operation;
   in response to determining that said one or more of said metadata records indicate said result of said previously detected search operation, said file system returning a result of said given search operation to said first application dependent upon said result of said previously detected search operation without retrieving the entirety of said first file from said computer-accessible storage device; and
   in response to determining that said one or more metadata records associated with said first file do not indicate a result of a previously detected search operation to determine the presence of a data pattern including said given data pattern within said first file, said file system instructing that said first file be searched to determine the presence of said given data pattern within said first file and said file system subsequently storing an indication, within one or more of said metadata records associated with said first file, of a result of said instructing that said first file be searched.

17. The computer-accessible storage medium as recited in claim 16, wherein the program instructions are further computer-executable to implement:
   in response to determining that said one or more of said metadata records indicate said result of said previously detected search operation, said file system determining whether said result of said previously detected search operation indicates that said given data pattern is present within said first file; and
   in response to determining that said given data pattern is present within said first file according to said result of said previously detected search operation, said file system accessing said computer-accessible storage device to retrieve only a portion of said first file and returning said retrieved portion to said first application as said result of said given search operation.

18. The computer-accessible storage medium as recited in claim 16, wherein said one or more of said metadata records that indicate said result of said previously detected search operation include an index corresponding to one or more portions of said first file in which said given data pattern occurs, and wherein the program instructions are further computer-executable to implement:
   in response to determining that said one or more of said metadata records indicate said result of said previously detected search operation, said file system determining whether said result of said previously detected search operation indicates that said given data pattern is present within said first file;
   in response to determining that said given data pattern is present within said first file according to said result of said previously detected search operation, said file system accessing said computer-accessible storage device to retrieve only the one or more portions of said first file corresponding to said index; and
   said file system returning said one or more retrieved portions to said first application as said result of said given search operation.

19. The computer-accessible storage medium as recited in claim 16, wherein the program instructions are further computer-executable to implement:
   in response to determining that said one or more of said metadata records indicate said result of said previously detected search operation, said file system determining whether said result of said previously detected search operation indicates that said given data pattern is not present within said first file; and
   in response to determining that said given data pattern is not present within said first file according to said result of said previously detected search operation, said file system returning a negative indication to said first application as said result of said given search operation without accessing said computer-accessible storage device to retrieve any portion of said first file.

20. The computer-accessible storage medium as recited in claim 16, wherein said file system storing said indication of said result of said instructing that said first file be searched further comprises:
   if said given data pattern is determined to be present in said first file, said file system storing an indication of said given data pattern and pattern location information in a metadata record within a positive search named stream associated with said first file and stored on said computer-accessible storage device; and
   if said given data pattern is determined not to be present in said first file, said file system storing said indication of said given data pattern in a metadata record within a negative search named stream associated with said first file and stored on said computer-accessible storage device.

21. The computer-accessible storage medium as recited in claim 16, wherein the program instructions are further computer-executable to implement said file system clearing metadata records associated with said first file that indicate results of previously detected search operations corresponding to said first file, in response to said file system detecting an operation to modify data stored in said first file.

22. The computer-accessible storage medium as recited in claim 16, wherein said file system instructing that said first file be searched to determine the presence of said given data pattern within said first file comprises said file system calling an external search application configured to execute within user space.

* * * * *

UNITED STATES PATENT AND TRADEMARK OFFICE
CERTIFICATE OF CORRECTION

PATENT NO. : 7,636,710 B2 Page 1 of 1
APPLICATION NO. : 10/793070
DATED : December 22, 2009
INVENTOR(S) : Borthakur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1328 days.

Signed and Sealed this

Ninth Day of November, 2010

David J. Kappos
*Director of the United States Patent and Trademark Office*